Sept. 9, 1941.  W. W. LANDSIEDEL  2,255,621
TOTAL CONTROL MEANS FOR ADDING MACHINES
Filed Nov. 25, 1936   5 Sheets-Sheet 1

INVENTOR
WALTER W. LANDSIEDEL

BY John L. Sterling

ATTORNEY

Sept. 9, 1941.    W. W. LANDSIEDEL    2,255,621
TOTAL CONTROL MEANS FOR ADDING MACHINES
Filed Nov. 25, 1936    5 Sheets-Sheet 2

FIG.1A

INVENTOR
WALTER W. LANDSIEDEL
BY John L. Sterling
ATTORNEY

Sept. 9, 1941.　　　W. W. LANDSIEDEL　　　2,255,621
TOTAL CONTROL MEANS FOR ADDING MACHINES
Filed Nov. 25, 1936　　　5 Sheets-Sheet 3

FIG. 3.

INVENTOR
WALTER W. LANDSIEDEL
BY
HIS ATTORNEY

FIG. 4.

INVENTOR
WALTER W. LANDSIEDEL
BY W. A. Sparks
HIS ATTORNEY

Sept. 9, 1941.    W. W. LANDSIEDEL    2,255,621
TOTAL CONTROL MEANS FOR ADDING MACHINES
Filed Nov. 25, 1936    5 Sheets-Sheet 5

INVENTOR
WALTER W. LANDSIEDEL
BY W. A. Sparks
ATTORNEY

Patented Sept. 9, 1941

2,255,621

UNITED STATES PATENT OFFICE 2,255,621

TOTAL CONTROL MEANS FOR ADDING MACHINES

Walter W. Landsiedel, Elmira, N. Y., assignor to Remington Rand Inc., Buffalo, N. Y., a corporation of Delaware Application November 25, 1936, Serial No. 112,649

3 Claims. (Cl. 235—60)

This invention relates to adding and like machines, and particularly to Dalton type bookkeeping machines in which a total is taken without the use of a regular total key.

The invention is shown embodied in the Dalton adding and recording machine which has been manufactured and extensively used for a number of years. This machine in its various forms has been the subject of a line of patents beginning with that to Hopkins, No. 1,039,130, September 24, 1912. Patent 1,649,478 to W. W. Landsiedel, November 15, 1927, describes a machine in which accumulators, one of which was capable of yielding true negative totals, were added at the rear of the machine; Patent No. 2,048,541, to E. H. Dreher, describes certain improvements on the Landsiedel machine; and Patent No. 2,014,560, to B. Dysart, describes further improvements on the Dreher machine. The Dalton machine as manufactured for a number of years has been of the general type described in the Dysart patent, but with a number of modifications and improvements.

The present invention has for its principal object to facilitate the operation of the machine for bookkeeping purposes, and particularly with respect to the taking of totals, both automatically under control of the paper carriage and manually by the operation of certain finger pieces. Heretofore the machine has been set for total taking by pushing in a total key which had a rather long stroke and offered an appreciable resistance and which was, therefore, not well adapted to be operated by a cam on the paper carriage. According to the present invention, the total-control mechanism is operated by a spring which is energized by the main operating mechanism, and is brought into action by merely tripping a restraining latch and this construction is so combined with a carriage cam and with manual setting devices and safety locks as that the whole construction affords a convenient and efficient and improved operation of the machine for bookkeeping work.

Other objects and structural details of the invention will be apparent from the following description when read in connection with the accompanying drawings wherein.

*Front and rear accumulators*

Figures 1, 2:
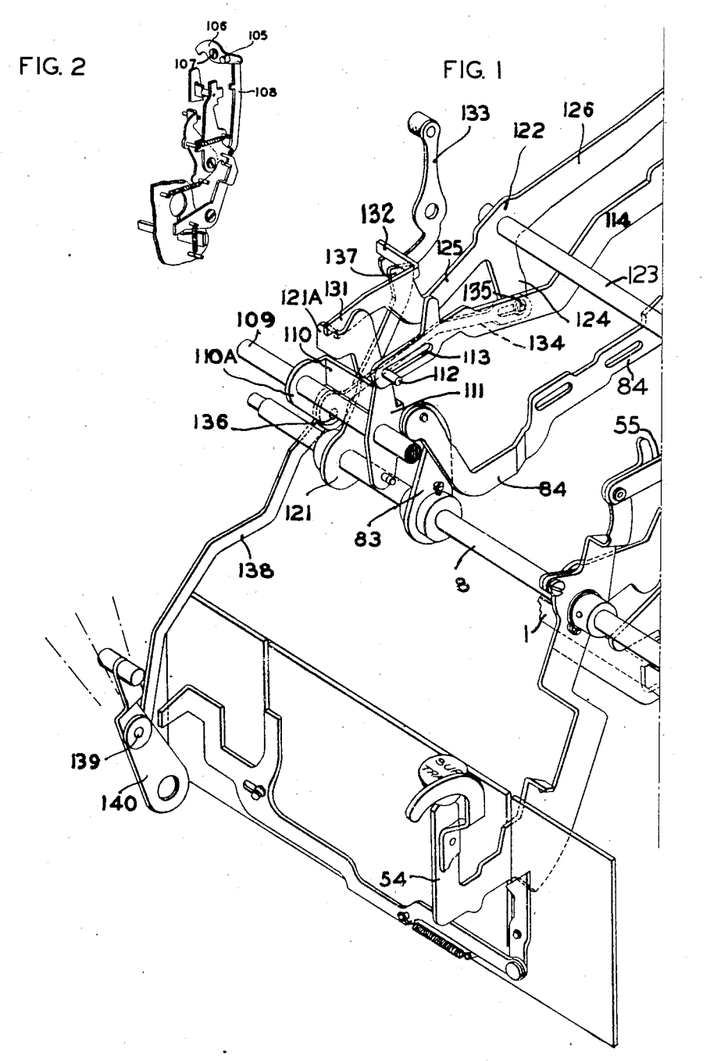
Figs. 1 and 1A together constitute a fragmentary isometric view showing only the parts of the invention and enough cooperating parts to give a general understanding of how the invention operates.
Fig. 2 is a detail isometric showing the blank stroke lock of the Dalton adding machine.
Figure 3:
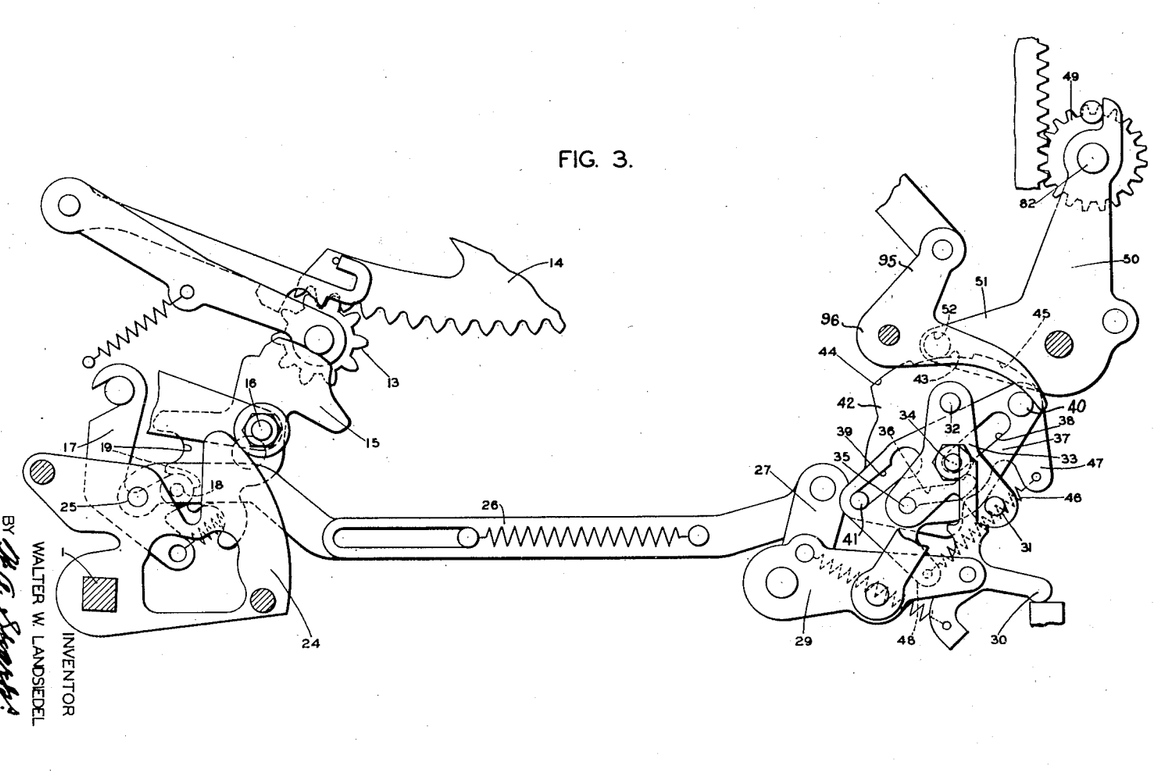
Fig. 3 is a right hand fragmentary detail sectional elevation taken just inside the right hand main frame of the machine and showing the front and rear accumulators and the main operating shaft.
Figure 4:
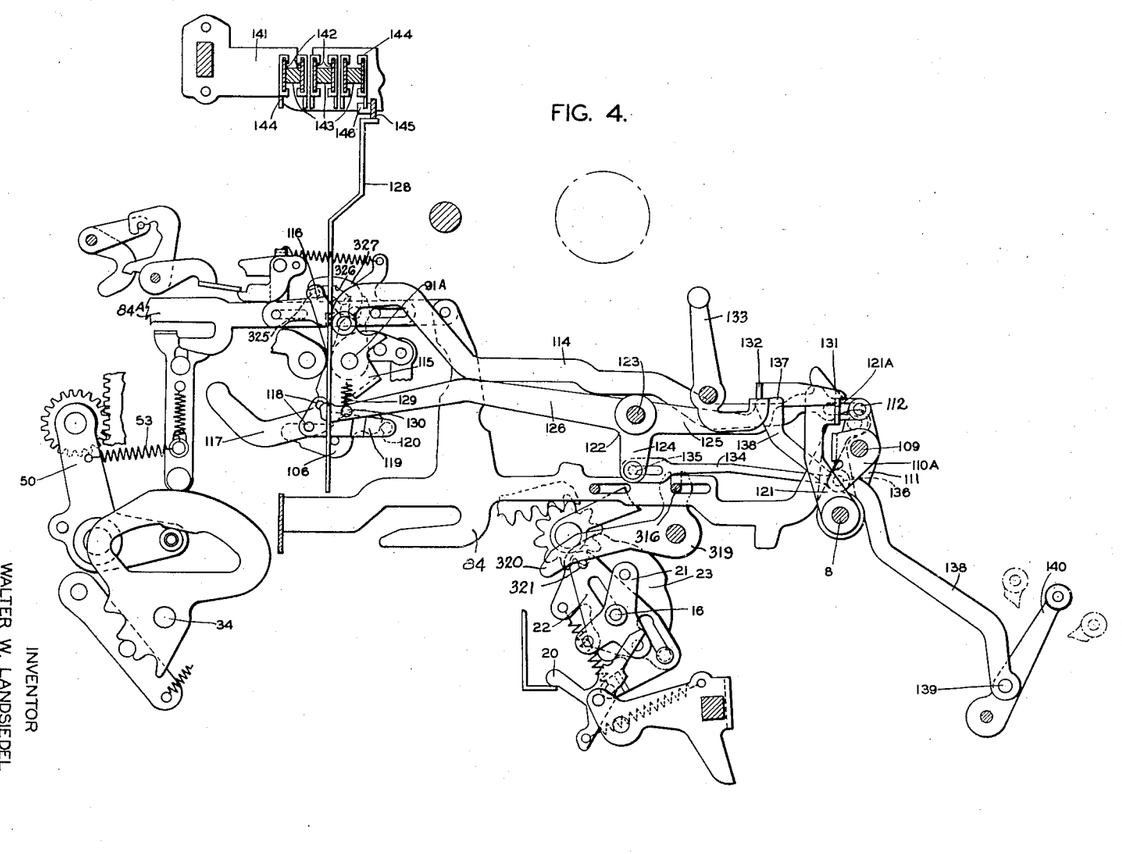
Fig. 4 is a left hand fragmentary detail sectional elevation taken just inside the left hand main frame showing the wipe pawl and cam for operating the front accumulators, the total control lever and associated parts, the total link and associated parts, part of the fugitive one mechanism, a section of the carriage, the total cam, the manual release lever, and the linkage from the total cam to the total shaft release latch.

As will be seen from Figs. 1, 3, and 4, the main operating shaft 1 (rocked by a handle not shown) holds a main cam 2 (Fig. 1) which is made with a full stroke sector 3 on its rear arm and a curve 4 on its front arm. This curve 4 supports a roller 5 carried by the rearwardly extending arm 6 of a bell crank 7. The bell crank 7 is fast on the usual total shaft 8 of the Dalton adding machine and has an upright arm 9 with an offset ear 10 to which is fastened a spring 11 anchored at its rear end to a pin 12 which is fast to the inner side of the right main frame (not shown) of the machine. The total shaft 8 is normally locked against rearward movement by means which will be later described. The main shaft 1 is rocked forward and back once for every machine operation and, during any but a total cycle, the curve 4 on main cam 2 moves forward and downward without operating the total shaft 8 through roller 5. If, however, the machine has been properly conditioned for a total, then, on the total cycle, the total shaft 8 will be unlocked and spring 11 will draw bell crank 7 clockwise as seen in Fig. 1 so that the roller 5 will be pressed snugly against the curve 4, and when the main shaft 1 is drawn counter-clockwise by the operating handle, the spring 11 will be allowed to draw the bell crank 7 clockwise and thus rock the total shaft 8.

The front accumulator wheels 13 (Fig. 3) are turned by the usual rack sectors 14 as is old and well known in the art. The wheels 13 are thrown into and out of engagement with the rack sectors by a cam 15 fast to the end of a rock shaft 16. The cam 15 is held in its various positions by a spring pressed detent member 17 bearing a roller 18 which engages one or another of the notches 19 in the cam 15. As will be seen from Fig. 4, the cam 15 is rotated with its rock shaft 16 by a wipe pawl 20 and pin plate assembly 21, 22, 23 similar to the one shown in Figs. 1 and 3 for moving the rear accumulator pinions. Since this arrangement is old in Dalton machines, and since it has been well described and shown in Dysart 2,014,560, it is thought that a brief description of these parts is all that is necessary and this will be given now.

Figure 1A:
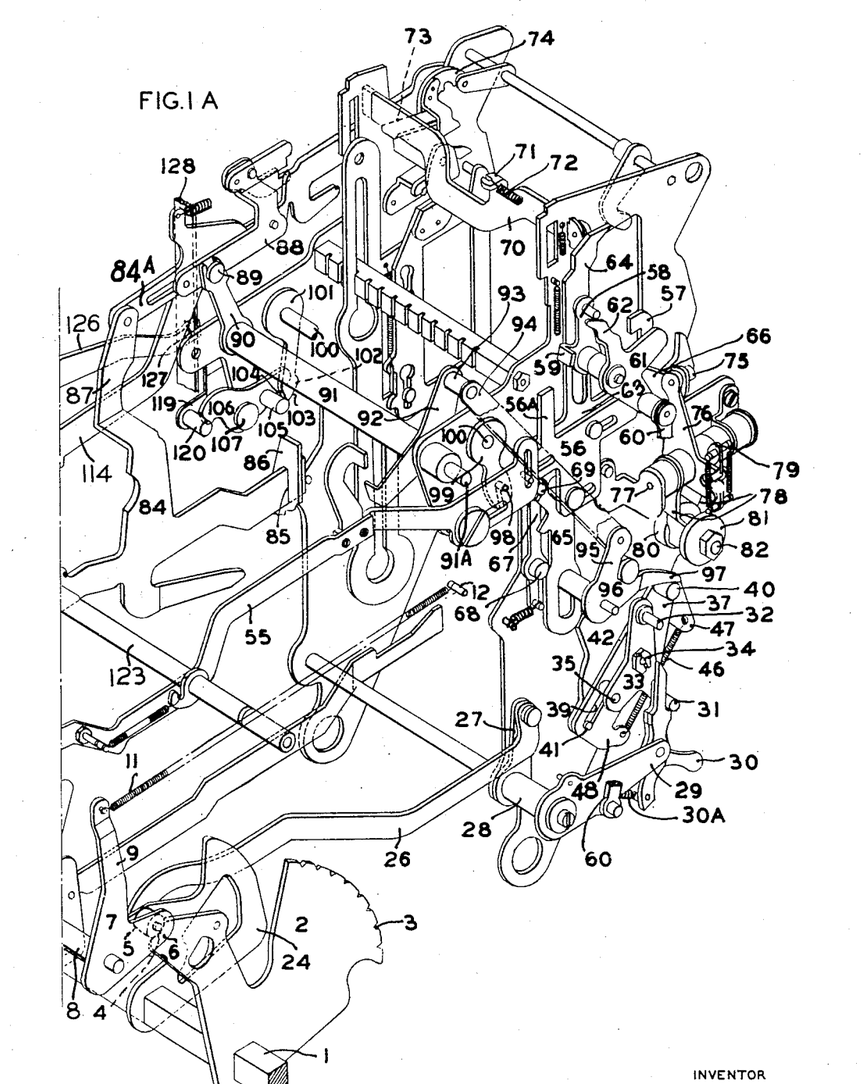

Referring specifically to Figs. 1 and 3, it will be seen that a plate 24 is made fast to the main shaft 1 and has, protruding from its left hand side, a stud 25 (Fig. 3) which pivots the front end of a split or extensible link 26. The rear end of link 26 is pivoted to an arm 27 which is fast to the left hand end of a sleeve 28 (Fig. 1) at the right hand end of which is fastened an arm 29 carrying at its rear end a wipe pawl 30. This wipe pawl is adapted to engage one or another of the pins 31 and 32 which are held on the pin plate 33. The front accumulator consists of one set of pinions and is an adding accumulator only, whereas the rear accumulator is an algebraic accumulator such as is shown and described in the Patent 2,014,560 to Dysart. In regular addition and subtraction operations, the pinions of the rear accumulators are thrown into and out of mesh with their respective racks by means of the wipe pawl 30 as has previously been described in a general way and which will now be described in detail. On the forward stroke of the operating handle, the main operating shaft 1 and hence, the plate 24 are swung counterclockwise. This pulls forward the link 26 and thus swings arm 29 counterclockwise with its sleeve 28. As the arm 29 moves counterclockwise, the wipe pawl 30, attached thereto, is drawn by its spring 30A against the pin 31 and as the pawl continues its movement it pushes the pin and pin plate 33 counterclockwise about the shaft 34. A pin 35 which extends leftwardly from the pin plate 33 (as viewed from the front of the machine) is held in a slot 36 in a total plate 37 which forms one part of the pin plate assembly. This total plate 37 is made with three slots 36, 38 and 39 as shown in Fig. 3 and holds a rightwardly extending stud 40 at its top which will be more fully described hereinafter. The slot 36, as has been previously mentioned, holds the stud 35 set in the pin plate 33, the slot 38 contains the shaft 34 and is merely to allow sliding movement of the total plate 37 during totaling operations and the slot 39 contains a pin 41 which protrudes rightwardly from a cam plate (as viewed in Fig. 1) 42 now to be described. The pin 41 and the shaft 34, in conjunction with the slots 39 and 38 respectively, guide the total plate 37 in its sliding movements as will be hereinafter explained. The cam plate 42 which is fast upon the right hand end of the shaft 34 is formed with an upper cam surface consisting of a depressed portion 43 and two raised portions 44 and 45 as is clearly shown in Fig. 3. A spring 46, shown in Figs. 1 and 3, is anchored at its upper end to an ear 47, formed integral with the cam plate 42, and at its lower end to an ear 48 formed integral with the total plate 37. This spring 46 tends constantly to draw the total plate 37 to its uppermost position where it is limited by the pin 41. From the foregoing it will be seen that, as the main operating shaft 1 is given its forward stroke, the wipe pawl 30 on any adding cycle, contacting pin 31 will move the pin plate 33, the total plate 37 and the cam plate 42 counterclockwise as a unit about the shaft 34. On the return stroke, the wipe pawl will contact the pin 32 and restore the above mentioned parts to normal position which is that shown in Figs. 1 and 3.

Referring particularly to Fig. 3, the rear accumulator pinions 49 are held by a pair of bail arms 50, the right hand bail arm (as viewed from the front of the machine) being the only one shown in Fig. 3. This bail arm 50 has the form of a bell crank and the forwardly extending arm 51 carries a roller 52 which is pressed by a spring 53, (Fig. 4) on the left hand bail arm 50, against the cam 42 (Fig. 3). It will thus be seen that on the forward stroke of any adding cycle, the accumulators will be thrown out of mesh by the rotation of cam plate 42 and that they will be thrown into mesh at the beginning of the return stroke by this same means. Subtraction is accomplished on this machine by the exact method taught by Dysart in his Patent 2,014,560, and as it has no direct bearing upon the present invention, it is not thought necessary to describe it in full here. Suffice it to say that when the subtract key 54 (Fig. 1) is depressed, it pulls forward the subtraction link 55 which, by a pin and slot connection, pulls the plate 56 forward and hence pulls forward the ear 57 which is formed integral therewith. A raising member 58 is formed with two opposite ears 59, the front one being shown in Fig. 1. A link 60, shown broken in Fig. 1, connects the arms 29 with an actuating member 61, said actuating member 61 having an upwardly extending finger 62 which engages the forward ear 59 on the raising member 58 at each forward stroke of the main operating shaft 1. When depression of the subtract key 54 pulls the plate 56 forward, the ear 57 thereon then overlies the rearwardly extending ear 59 of the raising member 58, and if the member 58 is now swung counterclockwise by the link 60 and the actuating member 61, it will be seen that the plate 56 will be raised. The plate 56 is attached by pin and slot connections to a plate 63 which (as seen in Fig. 1) is formed with an upwardly extending branch 64, a downwardly extending branch 65 and a rearwardly extending portion 66. The downwardly extending portion 65 is formed as shown with notches in its front. A spring pressed detent member 67 is pivoted at 68 and carries a roll or stud 69 at its top which engages one or another of the notches cut in the front of branch 65 to hold the entire plate 63 in either its upward or downward position. From the foregoing, it will be seen that, when the subtract key 54 is depressed and the machine is then operated, the plate 56 will be raised and that this will, in turn, raise plate 63. When the subtract key is released, the plate 56 is moved rearward and the upright finger 56A thereon is positioned in the path of the forward ear 59 of raising member 58. Upon the next subsequent stroke of the operating handle, the forward ear 59 will strike the upright finger 56A on the plate 56 and will return the plates 56 and 63 to adding position. The upper branch 64 of the plate 63 is offset and is in constant contact with the right hand end of a U- shaped cross bar 70 which is supported and guided for lateral movement in the inner machine frames as shown. An ear 71 is bent off from the cross bar 70 and carries one end of a spring 72, the other end of which is anchored to the right hand inner frame plate. The U-shaped cross bar 70 has a rearwardly projecting finger 73 near its left end which engages at its rear a forked member 74. Thus, it will be apparent that upon depression of the subtract key 54 and operation of the machine, the plate 63 will be raised and the branch 64 thereof will push the cross bar 70 to the left (as seen in Fig. 1) and that this will move the finger 73 and the member 74 to the left. The fugitive one mechanism controlled by the notched member 74, is clearly shown and explained by Dysart (above) and, since it forms no part of the present invention, will not be described here. The rearwardly extending branch 66 of the plate 63 is bent off to the right as shown in Fig. 1 and has a cam slot (not visible) in which rests a roller 75 mounted for rotation upon an arm 76 which is loosely mounted upon a shaft 77. Two arms 78 made fast to the shaft 77 are yieldingly connected to the above mentioned arm 76 through a spring carrying device 79. The arms 78 and arm 76 constitute a lever of the first order. The yielding or spring carrying device 79 is used in the present instance to prevent breakage in the event that the shaft 77 should become jammed, but this is no part of the present invention. The bottom end of arm 78 lies between two collars 80 and 81 which are fastened to the right hand end of a shaft 82 which supports the rear accumulator pinions 49 and which is mounted for lateral movement in the inner side frame plates of the machine. The cam slot in the rearwardly extending branch 66 of the plate 63 is so formed that, when the plate 63 is raised, it moves the roller 75 and hence, the arm 76 a small distance counterclockwise (as viewed from the front of the machine) and this moves the arm 78 counterclockwise to shift the rear accumulator pinions 49 (Fig. 3) out of mesh with their respective adding racks and into mesh with their respective subtracting pinions. The adding racks and subtracting pinions are not shown herein since they form no part of the present invention but are designated by the reference numerals 25 and 19 respectively in Fig. 4 of Dysart 2,014,560. When the subtract key 54 is released, the pinions 49 are returned to normal or adding position by the above mechanism just described.

*Total link and blank stroke lock*

Upon the total shaft 8, (Fig. 1) is an arm 83 mounted for rotation therewith which is pinned at its top to a total link 84, the rear end of which is supported for forward and rearward sliding movement in a slot 85 cut in a supporting plate 86 secured to the base (not shown) of the machine. When the total shaft 8, during the taking of totals, is permitted to rock clockwise, as viewed from the right hand side of the machine, the total link 84 will move toward the rear of the machine and by the upper arm 87 thereof will move the link 88 rearward in a manner well known in the art. The rearward movement of link 88, through its headed stud 89, will move the arm 90, fast to a sleeve 91 loosely mounted upon a rockshaft 91A, in a clockwise direction as viewed from the right hand side of the machine. Consequently, a bell crank 92 (fixed upon the sleeve 91) having a stud 93 at the end of its upper arm will be moved an equal number of degrees in the same direction. A link 94 is pivoted at its upper end to the stud 93 and at its lower end to the upper arm 95 of a bell crank 96. The rearwardly projecting arm 97 of the bell crank 96 overlies the stud or roll 40 on the total plate 37, hereinbefore described and it will, therefore, be evident that, whenever the total link moves rearward and moves the link 88 rearward, the total plate 37 will be depressed. The depression of total plate 37, through its slot 36 (Fig. 3) acting on the pin 35 on pin plate 33, will swing the pin plate 33 to such a position that the wipe pawl will not contact the pin 31 on its forward stroke and, hence, totaling will ensue in the usual manner taught in Patent 2,014,560 to Dysart. Totaling is accomplished in the same manner in the front totalizer.

Referring specifically to Figs. 1 and 2, it will be seen that Fig. 2 is a complete showing of the blank stroke lock which is fully described in the Dysart patent and is merely for the purpose of enforcing a blank cycle of the machine before any total cycle can be accomplished. It is, therefore, thought only necessary to describe the various methods for operating this blank stroke lock and this description will now follow. As can be seen in Fig. 1, the subtraction link 55 carries a pin 98, near its rear end, which engages in a slot in an arm 99 fast upon the right hand end of a shaft 100 which is shown broken away at its middle in Fig. 1. The left hand end of shaft 100, which is journaled in the inner side frames, carries a depending arm 101 which has a headed lower end 102 which is formed with two cam faces 103 and 104 adapted to act upon a stud 105 fast upon a rocking pawl 106 pivoted at 107 to the left inner machine frame. It will be seen that whenever the pawl 106 is moved a slight distance clockwise as viewed in Fig. 2, the tail of this pawl will engage the upright 108 on the blank stroke lock and will operate the lock to enforce a blank stroke before a total stroke. From the foregoing, it will be apparent that, whenever the subtract key 54 is depressed, the subtraction link 55 will, through its pin 98, pull the arm 99, shaft 100 and arm 101 clockwise as viewed from the right of the machine and that the cam face 104 on head 102 of arm 101 will cam down the stud 105 and operate the blank stroke lock. It will also be seen that, when the subtraction key 54 is released, the above mentioned parts will be returned to normal and that, during this process, the cam face 103 will again cam down the stud 105.

Figure 5:
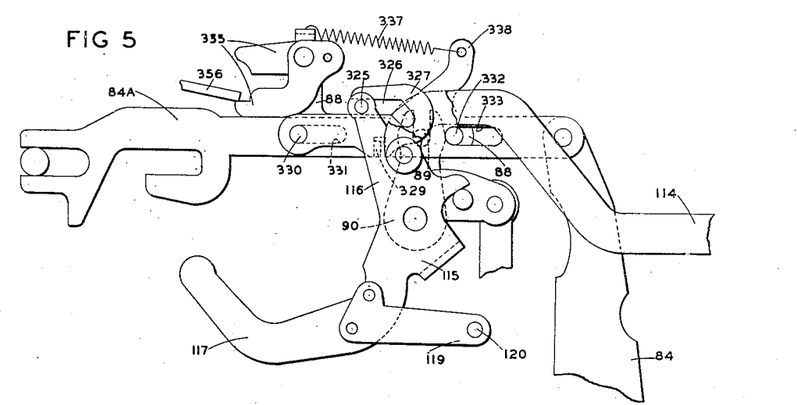
Fig. 5 is a fragmentary view of a portion of Fig. 4 but on a larger scale than Fig. 4.

A shaft 109, the left side of which is shown in Figs. 1 and 4, runs across the front of the machine and is journaled in the outer main frames (not shown). Loosely mounted upon the left hand end of shaft 109 is a bail shaped piece 110, the right hand arm 111 of which carries a pin 112 which protrudes through a slot 113 in a link 114. This link 114, as will be seen in Figs. 4 and 5, is pivoted at its rear end to a rocking bail 115, the right hand bail arm of which (as viewed from the front of the machine) is merely to form a bearing and the left hand bail arm of which is divided into an upper arm 116 and a lower arm or tail 117. The entire bail is fast to the rock shaft 91A (Figs. 1 and 4) and it is at the approximate middle of the upper arm 116 that the link 114 is pivoted.

With the control lever 140 in its normal middle position, totals accumulated on the rear totalizer, when printed, are added into the front totalizer, on which a grand total is thus accumulated.

When, following some one of these totals, it is desired to print the grand total, said lever is pushed to its rear position. At this time, the last operation was a total taking operation on the rear totalizer, and the blank stroke lock is unlocked; but it was an adding operation on the front totalizer, and a blank stroke is, therefore, needed before taking the grand total. Means are, therefore, provided whereby such setting of lever 140 operates the blank stroke lock. When the lever 140 is drawn to its forward position, the total is still taken from the rear totalizer, and there is no occasion to operate the lock.

Riveted by two studs 118 to the lower arm 117 is a short offset finger 119 which carries at its forward end a stud 120 (Figs. 1 and 4) which is adapted to engage the forward nose of the rocking pawl 106. It will, thus, be evident that when the link 114 is moved toward the front of the machine, the bail 115 will be rocked and the finger 119 will swing the stud 120 causing stud 120 to cam up the forward nose of the rocking pawl 106 and thus cause the tail of this pawl to actuate the blank stroke lock (Fig. 2). It will also be evident that the return of the link 114 to normal position will bring the stud 120 forward from behind the nose on the rocking pawl 106 and again trip the blank stroke lock.

*Total control lever*

Fast upon the left hand end of the total shaft 8 (Figs. 1 and 4) is an upright arm 121 having at its upper end an ear 121A bent off to the left as seen from the front of the machine. A spring pressed latch 122 is pivoted upon a cross shaft 123 and consists of three arms 124, 125 and 126. The rearward arm 126 protrudes through a slot 127 in a link 128 and the entire latch 122 is tensioned clockwise as seen from the left hand side of the machine, by a spring 129 (Fig. 4) anchored at one end to a stud 130 fast on the arm 126 of latch 122 and anchored at its other end to a portion of the machine frame (not shown). The forward arm 125 of latch 122 is formed with a notched nose 131 and has a lug 132 bent off to the left as seen in Fig. 1 and adapted to be engaged by a manually operated lever 133 which is pivoted to the left hand outer frame of the machine. The notched nose 131 of arm 125 normally lies as is shown in Fig. 1 so that it blocks the ear 121A and, hence, the lever 121 against any rotation which would be counterclockwise as seen from the left hand side of the machine. The downwardly projecting arm 124 of the latch 122 is a very short arm and pivots the rear end of a link 134 by a pin and slot connection 135. The front end of link 134 is pivoted at 136 to the left hand bail arm 110A of the bail 110 and at this same point is pivoted, near its midpoint, a link 138. The lower end of this link 138 is pivoted at 139 to a total control lever 140 which is manually movable to an upper and a lower position as shown and which is maintained normally in a central position by spring means, not shown. Before summation, it is to be understood that no total of any sort can be taken from either the front or the rear accumulator unless the main total link 84 moves to its rear or totaling position and it is also to be understood that no total can be taken without a previous blank stroke. It will be seen from the previous description that when the total control lever 140 is moved to its lowermost position, the link 138 will rock bail 110 counterclockwise as viewed from the left hand side of the machine and that this will pull forward the link 134 which, in turn, will rotate the latch 122 far enough in a counterclockwise direction, as viewed from the left hand side of the machine, to raise the nose 131 off the arm 121 and to thus allow the spring 11, bell crank 7, and cam 2 to move the total link rearward on a totaling operation. It will further be understood that, if the total control lever 140 is moved to its uppermost position, the link 138 will rock bail 110 clockwise as seen from the left hand side of the machine and that this will, through the pin 112, move the link 114 toward the front of the machine and thereby trip the blank stroke lock. This particular method of tripping the blank stroke lock is used to enforce a blank stroke previous to taking a total from the front totalizer. It will also be seen that the upper end 137 of link 138 will move the nose 131 of lever 122 far enough counterclockwise (as viewed from the left hand side of the machine) to clear the ear 121A of arm 121 and that this will permit the total link 84 to move rearward and this position of the total control lever 140 is used when it is desired to extract totals from the front totalizer.

Figure 6:
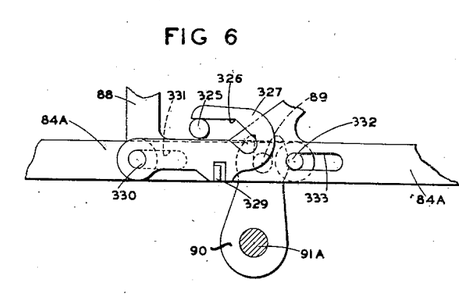
Fig. 6 is a fragmentary view of a detail of Fig. 4 but viewed from the right.

The swinging of the total shaft 8, resulting in a rearward movement of the total links 84 and 84A, sets the front and rear accumulating mechanisms selectively for the taking of totals, in substantially the same way as in the Landsiedel Patent 1,649,478, that is to say, the total setting fingers 320 and 97 are connected with said links by releasable hooks, and means are provided whereby, when the link 114 (like the link 121 of the patent) is in its normal rear position, the finger 97 is connected to the link 84a and finger 320 disconnected from link 84, and when said link 114 is drawn to its forward position the finger 320 is connected up and the finger 97 disconnected. As far as the present invention is concerned, the details of this hook mechanism and its controls may be of any suitable sort, as said details form no part of the present invention. Figs. 4, 5, and 6 show the rear mechanism as it has been used in the Dalton manufactured machines for a number of years, and in Fig. 7 the front mechanism has been copied from Fig. 31 of the Landsiedel patent.

Figure 7:
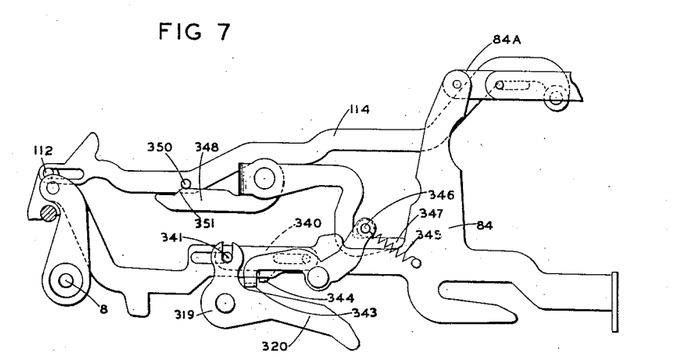
Fig. 7 is a fragmentary view of a portion of the mechanism shown in Fig. 4 but viewed from the right and having added thereto certain control devices copied from Fig. 31 of the patent to W. W. Landsiedel, No. 1,649,478, dated November 15, 1927.

The front mechanism shown in Fig. 7 includes a slide 340 lying against a face of the link 84 and having two studs 341 passing through longitudinal slots in said link. One of said studs is embraced up the upstanding arm of the total-setting piece 319, 320, so as to rock said piece to its active position by a rearward movement of the slide 340. The slide 340 is adapted to be operated by a hook 343 engaging a lug 344 of said slide, said hook being pivoted to the link 84 and urged to engaging position by a spring 345. The hook 343 is normally held out of engagement by a stud 346 on an arm thereof, resting on one arm 347 of a lever whose other arm 348 is held down by a stud 350 on the link 114. Said arm 348 has its edge inclined at 351 so that, when the link 114 is drawn frontward the lever 347, 348 and the hook 343 are rocked clockwise in Fig. 7 by the spring 345, bringing said hook into engagement with the lug 344. If now the total shaft 8 be rocked and the link 84 moved rearward, the slide 340 will move with it, rocking the finger 320 downward and setting the mechanism for a total from the front totalizer. If, however, the link 84 moves rearward when the link 114 is in the position shown in Fig. 7, the slide 340 will be held stationary and no total will be taken from the front totalizer.

In the rear total-setting mechanism shown in Figs. 1, 4, 5, and 6, the link 88, a rearward movement of which rocks the total-setting finger 97 as hereinbefore described is supported from the total link 84A by two studs 330 and 332 riveted into the piece 88 and lying in longitudinal slots 331 and 333 in the link 84A. A hook 327, pivoted to the link 88 on the stud 330, is adapted to engage a lug 329 fast on the link 84A, as shown more clearly in Fig. 6, whereby a rearward movement of link 84A will be communicated to link 88 and a total will be taken from the rear totalizer, and said hook does so engage said lug when the link 114 is in its rear position which may be regarded as its normal position. Movement of link 114 to its forward position rocks (clockwise in Figs. 4 and 5) a lever 115, 116, 117, as has been described hereinbefore. Arm 116 of this lever has a stud 325 embraced by an angled slot 326 in the hook 327, in such wise that when said arm is in its normal position shown, said stud holds the hook down in engagement, but when said arm is rocked clockwise, said stud passes into a downwardly inclined part of the slot and lifts the hook out of engagement with the lug 329, thus breaking the operative connection between the links 84A and 88, so that a rearward movement of the former is not communicated to the latter, and a total will not be taken from the rear accumulator. It will be recalled that this movement of the link 114 renders operative the total-setting mechanism for the front totalizer. When the hook 327 is out of engagement, the link 88 is held in its inactive position by any suitable spring, such as the spring 337, tensioned between a part of the link 88 and an arm 338 of the link 84A. Movement of the parts by this spring may be limited by any suitable stop, the one shown in Fig. 1 consisting of a fixed stud limiting the upward movement of finger 97.

It may be remarked in passing that an upstanding branch of the link 88 carries the fingers 355 which, together with a certain piece 356 constitute a lock which has been in use in the Dalton machine for a number of years and is described in the cited prior patents. This lock blocks rearward movement of the link 88 if the balance registered in the accumulator is positive and the computing mechanism is set for subtraction, and vice versa. When the total control lever is in its central position, totals from the rear accumulator) may only be permitted by either moving the manual release lever 133 rearward to move the latch 122 or by a total cam, mounted on the carriage, which will now be described.

*Total cam*

With reference particularly to Fig. 4, a section of the paper carriage is designated by the reference numeral 141. Fastened in either end of the carriage frame, are three cross bar assemblies consisting each of two cam supporting bars 142 which run the full length of the paper carriage and which are welded or otherwise suitably fastened to a central strengthening bar 143. One cam 144 is mounted on each support bar 142 and each cam 144 is adjustable laterally so that it may be positioned anywhere along its bar 142 as is set forth in the Patent 1,649,478 to W. W. Landsiedel. As the present invention is only concerned with the total cam, which is the rightmost cam as seen in Fig. 4, this is the only one which will be described herein. An arm 145 is pivotally mounted upon the frame of the machine and overlies the bent off top end of the link 128. To the rear side of arm 145 is fastened a stud or roll 146 which is adapted to be engaged by the total cam 144. As the paper carriage steps along, the total cam moves with it and at a predetermined time, depending upon the position at which the cam was set on its support bar 142, the total cam will depress the stud 146 and arm 145. This, in turn, will depress the link 128 which will depress the rear end of arm 126 on latch 122 and will raise the nose 131 off the ear 121A so that if, at this point, two successive handle strokes were taken, a total would be printed. Previous to this invention, if the machine operator inadvertently gave the operating handle two strokes (with the total key operated), a total would be printed regardless of the position of the paper carriage but with the present latching arrangement, if neither manual release lever 133 or 140 is moved, a total can be printed only at that place in the position of the paper carriage where the total cam 144 depresses the link 128. The total control lever 140 (Figs. 1 and 4) was previously used in this machine to control the operations of the front and rear accumulators by linkage and other mechanism not shown or described herein. When the total control lever 140 is in its lowermost position, it permits sub-totaling, and totaling in the rear accumulator and it prevents sub-totaling and totaling in the front accumulator. When the total control lever is in its central or unoperated position, it allows sub-totaling, and totaling in the rear accumulator and it prevents sub-totaling and totaling in the front accumulator. In this central position, any totals taken from the rear accumulator are automatically run into the front accumulator and it is in this central position of the total control lever 140 that the total cam 144, on the paper carriage, is used to allow totaling in the manner previously described. When the total control lever 140 is in its uppermost position, it prevents sub-totaling, and totaling in the rear accumulator and it allows sub-totaling, and totaling in the front accumulator. The control of the two accumulators by the total control lever 140, as has been previously stated, is old in this machine.

In summation, to take any total from either the front or rear accumulator, it is necessary to move the main total link 84 (Figs. 1 and 4) to the rear and, in order to do this, the cam 2 must be moved from beneath the roller 5 and the total shaft 8 must be unlatched by the nose 131 and the methods for unlatching the total shaft 8 at 131 are as follows:

(1) Depressing link 128 by means of the total cam 144 which is carried by the paper carriage.

(2) Manually moving the total control lever 140 to its lowermost position.

(3) Manually moving the total control lever 140 to its uppermost position.

(4) In special instances, manually moving the lever 133 rearward.

While I have described what I consider to be a highly desirable embodiment of my invention, it is obvious that many changes in form could be made without departing from the spirit of my invention, and I, therefore, do not limit myself to the exact form herein shown and described, nor to anything less than the whole of my invention as hereinbefore set forth and as hereinafter claimed.

What I claim as new, and desire to secure by Letters Patent, is:

1. In a machine of the class described, the combination with operating mechanism of two separate accumulators, a total link, means under control of said operating mechanism for actuating said link, a latch for latching said link against operation, means operable by said link to condition said operating mechanism for extracting a total from one of said accumulators, means operable by said link to condition said operating mechanism for extracting a total from the other of said accumulators, means including a total control lever for enabling one of said conditioning means and concomitantly disabling the other conditioning means, and means operable by said total control lever for disabling said latch.

2. In a machine of the class described, the combination with operating mechanism of two separate accumulators, a total link, means under control of said operating mechanism for actuating said link, a latch for latching said link against operation, means operable by said link to condition said operating mechanism for extracting a total from one of said accumulators, means operable by said link to condition said operating mechanism for extracting a total from the other of said accumulators, means including a total control lever for enabling one of said conditioning means and concomitantly disabling the other conditioning means, a paper carriage movable to various positions, a cam on said paper carriage, means operable by said cam in a predetermined position of said carriage to disable said latch to print totals from one of said accumulators in a columnar position on the paper, and means operable by said total control lever for disabling said latch independently of said cam, to print totals from the other accumulator.

3. In a key-controlled adding machine, the combination with a plurality of accumulators and operating and actuating means therefor for entering items and for taking totals, of a control lever settable to different positions to determine selectively the accumulator or accumulators to be actuated, a device spring urged to active position and acting when in that position to condition the operating means for the taking of a total, said device being restored to its inactive position by the return of the operating mechanism to its normal position, a blank stroke lock preventing the actuation of said device except in a cycle following a blank cycle of the machine, and a latch for restraining said device against movement to active position and released by an accumulator-selecting setting of said control lever; whereby said total-conditioning device tends to move to active position at every cycle of the machine but is restrained by said blank stroke lock in adding cycles and in the first blank stroke following an adding cycle and is released on a cycle following a blank cycle by the setting of said control lever to an accumulator-selecting position.

WALTER W. LANDSIEDEL.